INVENTORS.
GILBERT H. ROSS
COLIN J. ANDERSON
BYRON E. BEATY

BY Van Valkenburgh & Lowe

ATTORNEYS

LEAD FORMING TOOL

Filed Dec. 9, 1965 4 Sheets-Sheet 2

INVENTORS.
GILBERT H. ROSS
COLIN J. ANDERSON
BYRON E. BEATY

BY Van Valkenburgh & Lowe
ATTORNEYS

INVENTORS.
GILBERT H. ROSS
COLIN J. ANDERSON
BYRON E. BEATY
BY Van Valkenburgh & Lowe
ATTORNEYS Sept. 17, 1968 G. H. ROSS ET AL 3,401,548

LEAD FORMING TOOL

Filed Dec. 9, 1965 4 Sheets-Sheet 4

INVENTORS.
GILBERT H. ROSS
COLIN J. ANDERSON
BYRON E. BEATY

BY Van Valkenburgh & Lowe

ATTORNEYS

United States Patent Office 3,401,548

Patented Sept. 17, 1968

3,401,548

LEAD FORMING TOOL

Gilbert H. Ross and Colin J. Anderson, Denver, and Byron E. Beaty, Englewood, Colo., assignors to Martin-Marietta Corporation, New York, N.Y., a corporation of Maryland Filed Dec. 9, 1965, Ser. No. 512,690
15 Claims. (Cl. 72—389)

ABSTRACT OF THE DISCLOSURE

The tool has a pair of spaced longitudinally extending support surfaces across which the end portions of the leads of the component extend. Upstanding from the rearward end of each support surface is an anvil. A pair of longitudinally movable spurs are mounted adjacent to the support surfaces and engage portions of the lead so that when the spurs are moved rearwardly by a trigger mechanism, the lead ends are drawn past the anvils which form bends in the leads. The bent end portions of the leads extend axially beyond the ends of the tool and support the component so that the component can be mounted on a printed circuit board without removing same from the tool.

This invention relates to forming tools for aligning the axial wire leads of electrical components, and more particularly to hand tools for the custom forming of lead wires of electrical components to facilitate mounting the components on a printed circuit board. As such, the invention will be referred to as a lead forming tool.

The numerous small components used in electrical circuits and especially with printed circuits have become standardized in form insofar as possible. Two-wire components, such as resistors, capacitors and diodes are formed as small cylindrical members having an axially extended lead wire at each end. All are similar in appearance and are identified only by color coding and like markings. Such components are ideal for mounting upon printed circuit boards, for these boards are provided with spaced-apart mounting holes which are usually reinforced with eyelets. Thus, the circuit leads printed upon the board are connected with the lead wires of the components attached to the board by the simple operation of inserting the wires through the eyelets and soldering them into place.

In order to prepare a component for a printed circuit board, the opposing lead wires must be bent so that each wire will fit into its selected mounting hole. It is thus necessary to bend the lead wire ends so they will lie in parallelism transversely to the component and be spaced apart to fit the proper mounting holes in the circuit board. After the wires are inserted into the mounting holes, the component is spaced from the board, and the lead wires are soldered into place. Then the tag ends of the wire are cut off at the opposite surface of the board. This presents a neat-appearing arrangement of components which are securely held in position upon the board.

This bending of component leads has become an art in and of itself, and automatic lead benders are available for mass production operations. However, where only a few electrical systems are to be built, as on a custom or experimental basis, it is a common practice to bend each lead individually, as with a pair of pliers. However, hand bending is slow and not very neat and may result in breaking the component if not carefully done and may nick the wires. No fully satisfactory apparatus or system has been evolved for bending the leads for small production runs where it is not feasible to set up automatic lead bending equipment. Nevertheless, even in the construction of one or a few comparatively simple electronic devices, a large number of components may be required, and they may have to be bent at many different spacings.

The present invention was conceived and developed with the above considerations in view, and comprises, in essence, a hand tool for transversely bending the ends of axial lead wires of an electrical component to parallelism at a spacing which permits the wire ends to fit into a pair of selected holes in a printed circuit board. The tool carries a pair of arms with forming sections at their ends which are held in spaced opposition to each other and are adapted to be pre-set to any selected width to hold a component and bend the ends of its axial wire leads to the selected width. The presetting spacing operation is rendered quick and precise by providing gaging points on the arms which may be fitted into a pair of selected holes in a printed circuit board.

An object of the present invention is to provide a novel and improved lead forming tool which is a lightweight, easily operated hand tool adapted to bend the ends of opposing lead wires of an electrical component to parallelism at a preset selected spacing.

Another object of the invention is to provide a novel and improved lead bending tool which is easily and precisely set for bending the ends of wire leads at a selected spacing corresponding with the spacing of a pair of selected mounting holes in a printed circuit board.

Another object of the invention is to provide a novel and improved lead forming tool which is adapted to be quickly, easily and accurately adjusted for bending the opposing axial leads of many various types and sizes of electrical components at various spacings and also for bending of U-shaped bridge wires and the like.

Another object of the invention is to provide a novel and improved lead forming tool which neatly and accurately bends the axial wire leads of electrical components in a quick and simple manner, is especially suitable for small production operations where automatic lead bending machinery is not feasible and is also equally well adapted for use in the preparation of components for custom built and experimental electrical circuits. The tool not only produces neat-appearing and uniform radius bends, but also is much faster and more accurate than hand bending operations as with pliers, avoids the possibility of breaking the component and may be advantageously used to hold a component while its leads are being set in a board.

With the foregoing and other objects in view, all of which more fully hereinafter appear, our invention comprises certain constructions, combinations and arrangements of parts and elements as hereinafter described, defined in the appended claims and illustrated in preferred embodiment in the accompanying drawing, in which:

Figures 3, 4, 5, 6, 7:
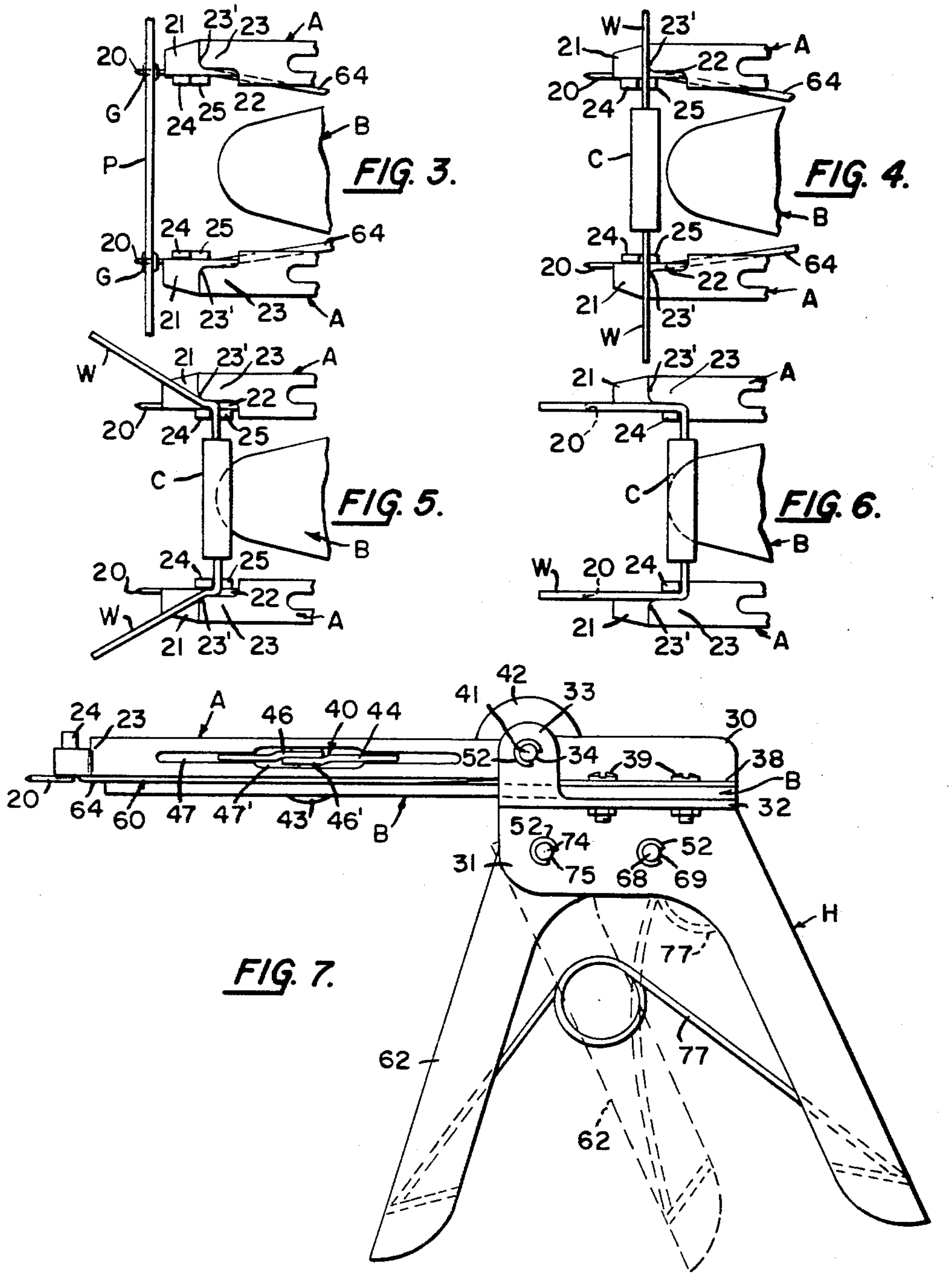

FIGURES 3, 4, 5 and 6 are fragmentary top plan views of the front end of the tool illustrative of the manner in which it operates: FIG. 3 illustrating the manner in which the arms are spaced apart to set the tool for a selected pair of holes in a printed circuit board; FIG. 4 the manner in which an electrical component is placed on the arms prior to bending; and FIGS. 5 and 6 the manner in which the ends of the leads of the component are bent to parallelism at the preset spacing.

FIGURE 7 is a side elevational view of the tool with broken lines indicating an alternate position of movable parts thereof.

Figures 8, 13, 14:
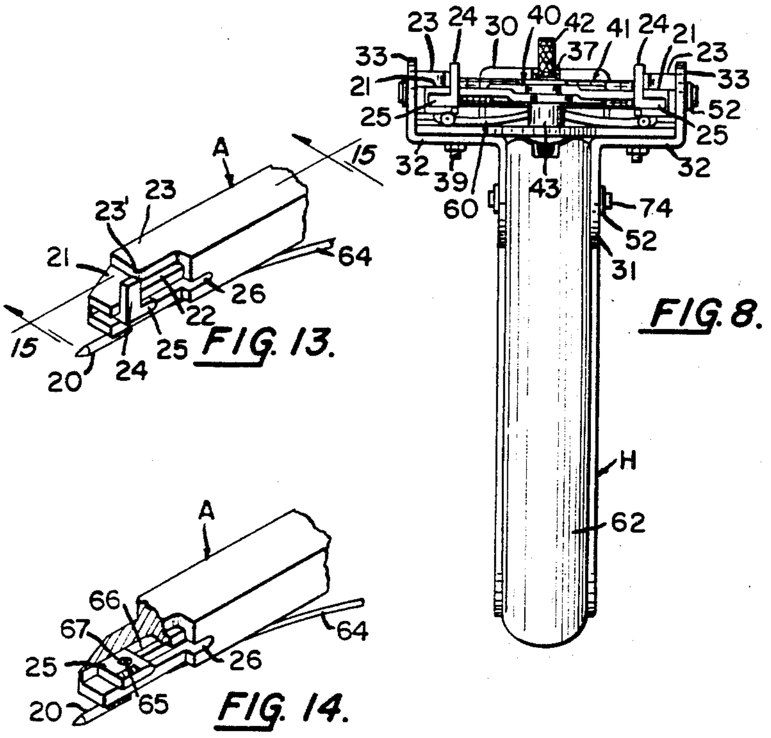

FIGURE 8 is a front elevational view of the tool.

Figure 2:
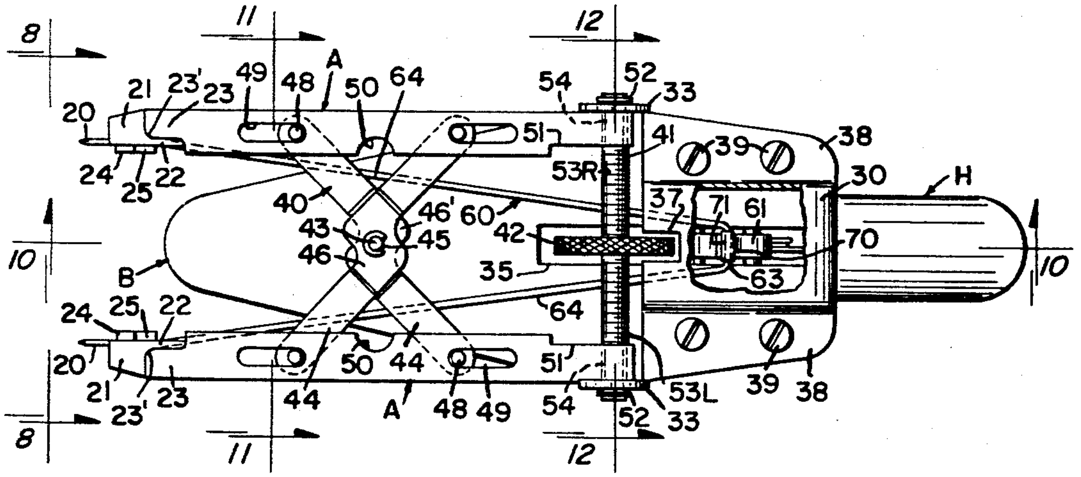
FIGURE 2 is a top plan view of the tool with its arms set apart at a maximum spacing.
Figure 9:
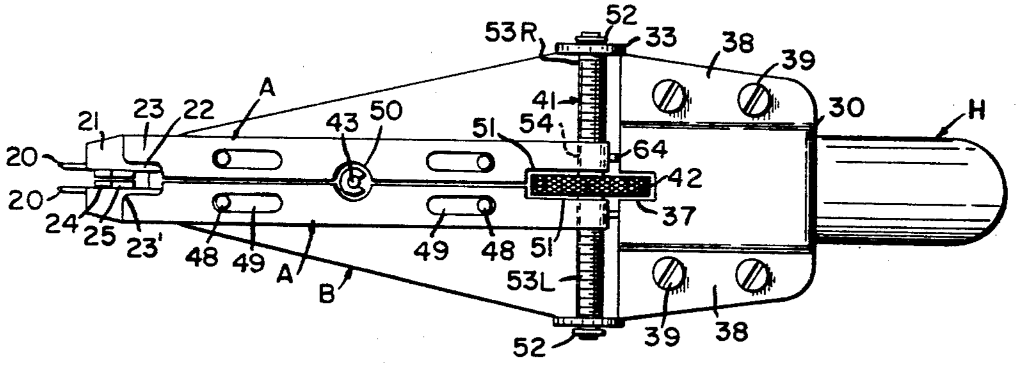

FIGURE 9 is a top plan view of the tool, similar to FIG. 2, but with its arms set together at a minimum spacing.

Figure 10:
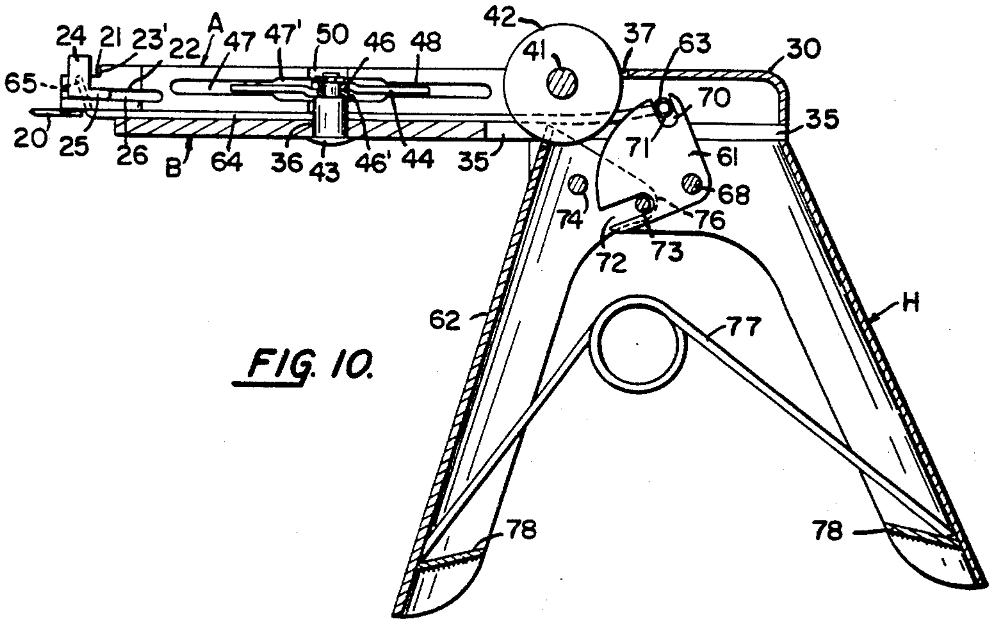

FIGURE 10 is a longitudinal sectional elevation as taken from the indicated line 10—10 at FIG. 2.

Figure 11:
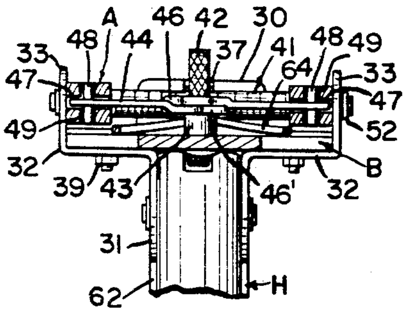

FIGURE 11 is a transverse sectional elevation as taken from the indicated line 11—11 at FIG. 2, but with the handle portion being broken away.

Figure 12:
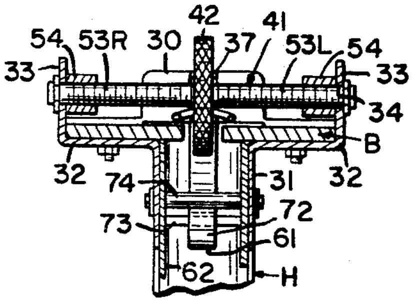

FIGURE 12 is a transverse sectional elevation as taken from the indicated line 12—12 at FIG. 2, but with the handle portion being broken away.

FIGURE 13 is a fragmentary isometric view of the front end of an arm as taken from the indicated arrow 13 at FIG. 2.

FIGURE 14 is an isometric view, similar to FIG. 13, but with portions broken away to show parts otherwise hidden from view.

Figure 15:
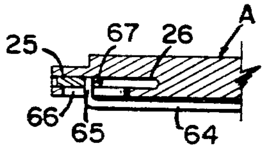

FIGURE 15 is a fragmentary sectional detail as taken from the indicated line 15—15 at FIG. 13.

Figure 1:
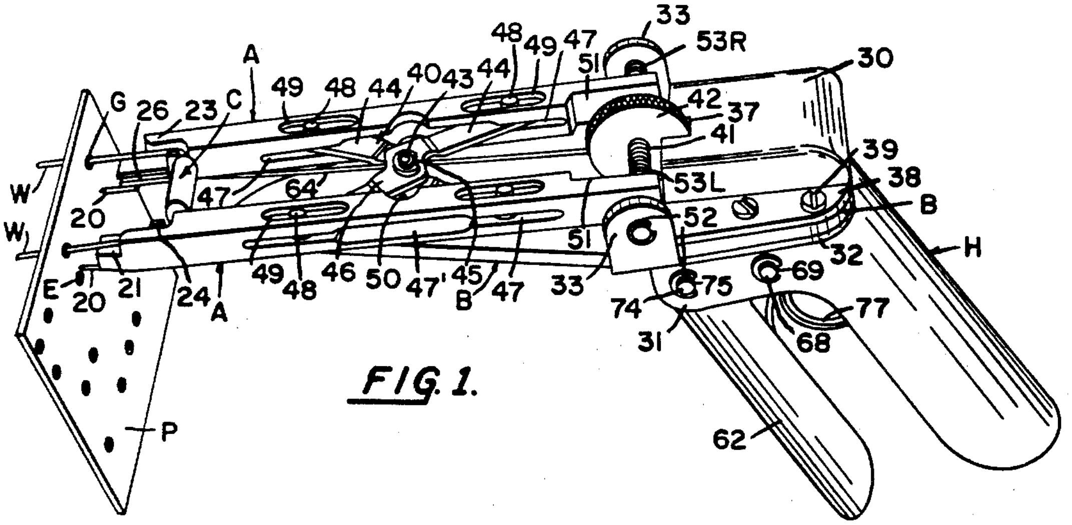
FIGURE 1 is a perspective view of the lead forming tool with an electrical component mounted therein and with the leads of the component bent to spaced parallelism and inserted into a pair of eyelets in the board of a printed circuit, illustrative of one manner of using the tool for holding a component while the leads are being soldered in place in the board.

Referring more particularly to the drawing, FIG. 1 illustrates the lead forming tool as it would appear after bending the axially aligned wire leads W of a cylindrical electrical component C and, while holding this component within the tool, inserting the leads W into eyelets E in a printed circuit board P. This figure is illustrative of only one mode of using the tool, for it may also be used to prepare the leads of a number of components C for later insertion into holes of printed circuit boards with other holding devices, or even manually.

The tool itself is formed as a simple, flat body member B, having a piston grip handle H at its rear end. Two longitudinally extended, opposing arms A are supported above the body B by adjusting mechanisms, hereinafter described, which permit the arms to move together or apart to any spacing, but to always remain in spaced parallelism.

The forward ends of the arms constitute forming sections which are adapted to first receive an electrical component placed transversely between them, with the opposing axial lead wires W of the component lying upon the arms. Thereupon, the ends of the lead wires are bent forwardly to parallelism at a selected spacing. To precisely set the arms to such selected spacing before bending, the forward end of each arm A includes an outstanding spacer pin 20 at its inner edge. These spacer pins are adapted to be fitted in an eyelet E of a printed circuit, as illustrated at FIG. 3.

Each arm is formed as a square-sectioned bar. Its front end, the forming section, is rabbeted to provide a transversely disposed shelf 21, whereupon the wire lead W of a component is placed. A narrow spacing ledge 22 at the inner side of each arm and in alignment with pins 20 forms a continuation of the shelf 21. The upstanding wall portion of each arm section at the back of the shelf and ledge constitutes a wire-contacting anvil 23, its inner corner 23' between the shelf and ledge being suitably rounded to ease the bending movements of a component wire W.

A forming spur 24 is mounted at the inner wall of each arm A on a slide block 25, which, in turn, is longitudinally shiftable in a slot 26 at the forward end of each arm below the shelf and ledge. Each forming spur 24 upstands from its block 25 to extend above the surface of the shelf 21 and ledge 22, and is shiftable in unison with the movement of the other spacer to move from an initial position near the outward end of the shelf 21 to a final position alongside the ledge 22, as hereinafter described, to form constant radius bends.

The operation of bending the lead wires of an electrical component by this improved tool involves a very simple sequence of steps, the primary movement being the movement of the forming spurs 24. First, the arms A are suitably spaced apart by setting the spacer pins 20 into a selected pair of eyelets E in a printed circuit board, FIG. 3. Next, a selected component C is placed between the arms A with each opposing, axially aligned wire W lying upon a shelf 21 between the endwall of the anvil 23 and the spurs 24, FIG. 4. A rearward movement of the spurs along the inner wall of the arms bend the wires simultaneously as they turn around the anvil corner 23', FIG. 5, to form constant radius bends and to place the ends in spaced parallelism upon the ledges 22 between the sidewalls of the anvil 23 and the spurs 24, and precisely above the spacer pins 20, as illustrated at FIG. 6.

The construction of the hand tool, as further shown in FIGS. 1, 2 and 7 to 15, is a simple and neat arrangement, including a rigid framework whereon arm-holding, adjusting and spur-shifting components are mounted. The framework and the tool itself is a symmetrical structure with respect to the vertical, longitudinal plane of the body B, with all parts at one side having opposite hand parts at the other side. The framework includes the handle H, the body B, which is mounted upon the handle to give the unit a pistol-like appearance, and a cover cap 30 over the rearward end of the body. The arm-holding and adjusting components include a cross arm linkage 40 on the body adapted to hold the arms A in parallelism and a transverse adjusting screw 41 adapted to space the arms. The spur-shifting components form a linkage, including a U-shaped pull yoke 60, whose ends connect with the slide blocks 25 to extend rearwardly therefrom, a bell-crank pivot 61 in the top of the handle, best seen in FIG. 10, connecting with the crotch of the pull yoke and a gripping lever 62 on the handle adapted to rotate the pivot.

The handle H is rearwardly extended, downsloping gripping member formed by folding sheet metal to a general U-shape. The invert of the U-fold is at the rearward edge of the unit and each side portion thereof includes a forwardly projecting wall plate 31 at its top, above the gripping portion of the handle, as in FIGS. 1 and 7. The wall plates 31 form a cavity at the top of the handle, wherein the pivot 61 and gripping lever 62 are mounted.

Each wall plate is formed with an outturned flange 32 along its top edge to provide a bearing surface to hold the body B. A lug 33 upstands from the outer edge of each flange 32 near the forward end of the flange. The pair of lugs 33 opposing each other are spaced transversely apart and include bearing holes 34 for holding the adjusting screw 41. It is to be noted that the lugs are spaced apart sufficiently to accommodate the arms A at their maximum sptced-apart setting, as shown in FIG. 2.

The body B is a flat, longitudinally extended, tongue-shaped plate having its rearward end mounted upon the handle flanges 32. It includes a central longitudinal slot 35 at its rearward portion, over the handle, to provide clearance for a central thumb wheel 42 on the adjusting screw 41 and for the bell-crank pivot 61 which is mounted at the top of the handle to extend upwardly through the slot for connection with the pull yoke 60. The body also includes a hole 36 near its forward end, as in FIG. 10, to hold an upstanding pivot post 43 for supporting the cross arm linkage 40.

The cap 30 is formed as an inverted, dished member end to be set over the rear end of the body to enclose the bell-crank pivot 61 and a portion of the thumb wheel 42, a slot 37 being formed in the forward edge of the cap to receive an edge of the wheel. This cap is formed with side flanges 38 having a similar configuration to the rear portion of the body B, and is secured to the body and to the handle flanges 32 by an array of connecting bolts 39 through registering holes in the three members.

The cross arm linkage 40 consists of two simple, flat bar links 44. Each link includes a central mounting hole 45 which fits upon the post 43 so that one link lies upon the other in a crossing scissor action position. Each end of each link extending from the post is slidably connected to an arm A. To effect this slidable connection, the four ends of the two links are placed in a common plane by an upward offset 46 at the center portion of the upper link and a corresponding downward offset 46' at the center portion of the lower link as in FIG. 7, and the four ends lie in longitudinally extended slots 47 through the sides of each arm. To form the offsets, the links 44 may be identical and one turned over with respect to the other.

A pin 48 is extended through the end of each link and slidably fits in a longitudinally disposed slot 49 through the top and bottom of the arm A. Each slot 49 intersects slot 47 within the arm, and the pins 48 hold the links in place in the arms. Each slot 49 is sufficiently long to permit movement of the pin 48 within it, so that the arms A may be moved from a contacting position for a minimum spacing, as illustrated at FIG. 9, to a spread apart position for a maximum spacing, as illustrated at FIG. 2. To provide clearance for this range of movement, a single, continuous slot 47 extends through the sides of each arm A which is of sufficient extent to accommodate the maximum spread of the link when the arms are together. Also, each slot 47 is not only of sufficient width to hold the ends of the flat links, but it is widened at its central portion, as at 47', see FIG. 1, to receive the central offsets 46 and 46' of the links whenever the arms are moved together. In order to permit clearance of the mounting post 43 and the thumb wheel 42, when the arms are moved together, each arm includes a half-socket 50 at its inner side to accommodate the central post 43 and opposing notches 51 at the rearward end to accommodate the thumb screw.

It is to be noted that the cross arm linkage 40 is effective only to hold the two arms A in spaced parallelism as they move together or spread apart. A further restraint of the arms is effected by the adjusting screw 41 and held in place on the lugs 33 by clips 52 at each outer end thereof. The thumb wheel 42 is positioned at the center of this adjusting screw, and each side is oppositely threaded with threads 53R and 53L, respectively. The rearward end of each arm A includes a transverse, threaded orifice 54 having threads corresponding with an fitting upon its side of the adjusting screw.

The pull yoke 60 is a U-shaped member of rigid, comparatively heavy wire which lies upon the body B. The crotch 63 of this pull yoke is connected with the bell crank 61 and the legs 64 of the yoke extend forwardly therefrom to straddle the wheel 42 and post 43, with the end of each leg having a short upturn 65 for connection with a slide block 25, as in FIG. 14. The slide block 25 is mounted within the slot 26 at the inner side of the front of each arm A to move longitudinally within the slot to shift the forming spur 24 against the inner wall of the arm A, as heretofore described. Connection of such block 25 with the yoke leg upturn 65 is through a longitudinal slot 66, which is formed in the forward end of the underside of each arm and opens into the side slot 26. Each upturn 66 thus slidably fits into the slot 66 and securely fits into an orifice 67 in the slide block, all as illustrated at FIGS. 13, 14 and 15. The upturned end 65 of each pull yoke is thus restrained by the bottom slot 67, and it effectively holds the slide block in place within the slot 26.

The bell-crank pivot 61 is a flat member formed similar to a quadrant segment of a circular disc. It is upon a transversely disposed shaft 68 which is secured between the wall plates 31 of the handle H, as in mounting holes 69 in the plates and held against side shifting by ring clips 52. This pivot 61 has an upper portion which lies within the slot 35 and extends above the body to connect with the pull yoke crotch 63. This connection is through a slotted socket 70, and a roller 71 is placed about the yoke crotch to reduce friction when the crotch slides in the socket. The lower portion of the pivot 61 which lies between the wall plates 31 includes a second slotted socket 72 at its lower edge, which is adapted to receive a transverse pressure pin 73 carried on the gripping lever 62.

The gripping lever 62 is formed of sheet metal as a folded member, U-shaped in section, having its invert forwardly disposed in spaced opposition to U-shaped handle H, the lever being narrower than the handle, so that its upper end may lie between the wall plates 31 of the handle. It is pivotally connected to these wall plates by a transversely disposed shaft 74 extending through suitable mounting holes 75 in the wall plates, with the ends of the shaft held by ring clips 52. The upper end of each side portion of this handle is formed as a rearwardly extending spur 76 which carries the transverse pressure pin 73, heretofore described.

The gripping lever 62 will be normally positioned at a forward extreme of movement, where the bell-crank pivot 61 is rotated to extend the yoke 60, slide block 25 and spurs 24 in their forward extreme position to permit an electrical component to be placed on the shelf. Moving the gripping lever rearwardly towards the handle to the position, as shown at FIG. 1, and in broken lines at FIG. 7, effects rotation of the bell-crank pivot 61 to move the yoke 60 rearwardly and a corresponding rearward movement of the forming spurs 24 to bend the lead wires of a component, which may be placed in the tool. It is contemplated that when the gripping lever is released, it will return to its forwardly extended position, and a spreader spring 77 is placed between the U-shaped handle and the U-shaped gripping lever, as with its ends being held in shelf notches 78 within the handle and lever.

The operation of this apparatus is the essence of simplicity. First, the arms A are set at a selected spacing as determined by placing the pins 20 into eyelets E in the printed circuit board P. Then, an electrical component is placed upon the shelf 21, and the bending of the lead wires of the component, as heretofore described, is effected by simply squeezing the lever 62 against handle H. The prepared component may then be placed in the selected eyelets of a printed circuit board before it is released from the tool, FIG. 1, or it may be released from the tool and stored for future use. The wires of many different types and sizes of components can be prepared for various hole spacings in a printed circuit board by simple adjustments of the apparatus with the thumb wheel 42. Also, simple wire bridges can be bent to a U-shaped form very quickly to bridge circuit portions, where a printed circuit is unnecessary.

While we have now described our invention in considerable detail, it is obvious that others skilled in the art can build and devise alternate and equivalent constructions, which are nevertheless within the spirit and scope of our invention; hence, we desire that our protection be limited, not by the constructions illustrated and described, but only by the proper scope of the appended claims.

We claim:

1. An apparatus for bending the ends of opposing axial lead wires of an electrical component and the like, comprising:

a pair of transversely opposed, spaced shelves adapted to support the lead wires of a component placed transversely between them, with the end of each lead wire extending laterally of the shelf on which it is placed;

an abutment anvil upstanding from the back of each shelf, having a corner adjacent to the inner edge of the shelf and being adapted to bear against a lead wire of a component placed upon the shelf; and a longitudinally shiftable means adapted to contact each lead wire adjacent to each shelf and to pull said component and wire portions longitudinally past the anvils, whereby the anvils turn the ends of the wires in a longitudinal direction, forming constant radius bends therein.

2. In the apparatus defined in claim 1, wherein said shiftable means include a pair of transversely disposed spurs mounted between the shelves on said shiftable means, with each spur being alongside a shelf.

3. In the apparatus defined in claim 1, wherein said shiftable means lie between the shelves, and the shelves include ledges forming narrow continuations of their inner opposing sides past the anvil, whereupon the wire ends of a component lie after they are bent responsive to the aforesaid movement of the shiftable means.

4. In the apparatus defined in claim 1, wherein the opposing corners of the anvils, whereabout the wire leads are bent, are rounded to facilitate the bending of the wire ends as the shiftable means carrying the component moves therepast.

5. In the apparatus defined in claim 1, wherein said shelves are formed on the forwardly extended ends of longitudinally disposed arms, with an anvil being behind each shelf, a body carrying a variable width supporting means supporting the arms in spaced parallelism, and an adjusting means on the body adapted to vary the spacing between the arms.

6. In the apparatus defined in claim 5, wherein said shiftable means include a pair of transversely opposing spurs, with each spur being slidably mounted upon the inner side of an arm to normally lie adjacent to the shelf and to move rearwardly therefrom and past the anvil.

7. In the apparatus defined in claim 6, including a slot in each arm below its shelf, a block slidably mounted within the slot and with said spur upstanding from the block.

8. In the apparatus defined in claim 5, wherein said body is formed as a flat, plate-like member having a scissors linkage mounted upon it, the ends of the linkage being shiftably connected with the arms, whereby the scissors movement of the linkage holds the arms in spaced parallelism and said adjusting means includes an adjusting screw mounted over the body, transversely between and connecting into threaded sockets in the arms by opposingly directed threads, whereby turning the adjusting screw in one direction moves the arms together and turning in the other direction moves them apart.

9. In the apparatus defined in claim 1, wherein said apparatus constitutes a pistol grip type of hand tool, having a longitudinally extended body and a handle portion at its rearward end, a pair of arms mounted in spaced parallelism upon said body, with said shelves and anvils being at the forwardly extended ends of the arms, and wherein said shifting means include a spur at the inner side of each arm alongside its shelf, a block supporting each spur and being shiftably mounted upon the arm to move the spur from a position alongside the shelf and past the anvil behind the shelf, a yoke having a pair of legs with a leg extending rearwardly from each block, a gripping lever at the handle, and means connecting the gripping lever and rearward end of the yoke, whereby to effect said movement by actuating said gripping lever.

10. In the apparatus defined in claim 1, including a pair of arms, a mounting means adapted to hold the arms in spaced parallelism, an adjusting means adapted to vary the spacing of said arms, said shelves being disposed on the forward extended ends of the arms with the anvils behind them, and wherein said shifting means comprise a spur slidably mounted on the inner side of each arm; a yoke having each leg connected with a spur and extending rearwardly therefrom; and actuating means at the rear end of the apparatus connecting with the crotch of said yoke and being adapted to shift the same rearwardly and to move the spurs rearwardly in unison from a position alongside said shelves, to a position past said anvils.

11. In the apparatus defined in claim 10, including a a lever adapted to be gripped to effect said rearward movement of the spurs and a resilient means adapted to return said spurs to the initial position alongside the shelves.

12. A hand tool for custom forming the lead wires of an electrical component and holding the formed component while it is mounted on a printed circuit board comprising support means for supporting the unformed lead wires of a component to be mounted on a printed circuit board, lead bending means operatively associated with said support means for bending the leads including relatively movable means engageable with the lead wires to effect bending of the lead wires to form lead ends which project beyond the tool and are spaced from one another a distance corresponding to the distance between lead receiving openings in the printed circuit, so that the formed leads can be inserted into the lead receiving openings while being supported by the tool.

13. A tool as defined in claim 12, wherein said support means includes a pair of spaced support surfaces adapted to receive the leads of the component and thereby support the component in suspension therebetween and said lead bending means include first and second pair of relatively movable parts supported upstanding from the rearward end portions of said support surfaces and adjacent to said support surfaces, respectively, said second pair of parts engageable with said leads and actuator means for moving one of said pairs of parts relative to the other pair of parts to effect bending of the leads of the component.

14. A tool as dfefined in claim 13, further including means for adjusting the distance between said support surfaces and between the corresponding parts of each of said pairs of relatively movable parts so that the distance between the bent ends of the leads correspond to the distance between the receiving openings in the printed circuit board.

15. A tool as defined in claim 14, wherein said second pair of parts are relatively thin and support portions of the leads, said thin parts being positioned between the component body and said support surfaces and thereby permit extensive adjustment of said thin parts toward said component.

References Cited

UNITED STATES PATENTS

| | | | |
|---|---|---|---|
| 2,217,486 | 10/1940 | Larson | 72—389 |
| 2,737,211 | 3/1956 | Perry et al. | 140—71 |
| 2,955,624 | 10/1960 | Ferm | 140—123 |
| 2,963,053 | 12/1960 | Ferm | 140—123 |
| 3,212,368 | 10/1965 | Hutchinson et al. | 140—123 |
| 3,239,855 | 3/1966 | Lhomme et al. | 140—93 |
| 3,253,327 | 5/1966 | McElligatt | 29—203 |

CHARLES W. LANHAM, *Primary Examiner.*

E. M. COMBS, *Assistant Examiner.*